(12) United States Patent
Ibaraki et al.

(10) Patent No.: US 7,808,905 B2
(45) Date of Patent: Oct. 5, 2010

(54) TRANSMISSION METHOD, SENDING DEVICE AND RECEIVING DEVICE

(75) Inventors: Susumu Ibaraki, Yokohama (JP); Akihiro Yamamoto, Osaka (JP); Toshiaki Mori, Mino (JP); Toshikazu Hattori, Yokohama (JP)

(73) Assignee: Panasonic Corporation, Osaka (JP)

( * ) Notice: Subject to any disclaimer, the term of this patent is extended or adjusted under 35 U.S.C. 154(b) by 1770 days.

(21) Appl. No.: 10/490,558

(22) PCT Filed: Sep. 25, 2002

(86) PCT No.: PCT/JP02/09891

§ 371 (c)(1), (2), (4) Date: Aug. 30, 2004

(87) PCT Pub. No.: WO03/030165

PCT Pub. Date: Apr. 10, 2003

(65) Prior Publication Data

US 2005/0007957 A1    Jan. 13, 2005

(30) Foreign Application Priority Data

Sep. 27, 2001  (JP) .............................. 2001-297321
Sep. 27, 2001  (JP) .............................. 2001-297322
Oct. 17, 2001  (JP) .............................. 2001-320025

(51) Int. Cl.
*H04L 12/26*   (2006.01)
(52) U.S. Cl. .......................... 370/235; 370/498; 386/46
(58) Field of Classification Search ................. 370/510, 370/522, 235, 464; 386/46, 125, 109; 725/80
See application file for complete search history.

(56) References Cited

U.S. PATENT DOCUMENTS 3,812,475 A * 5/1974 Christiansen et al. .......... 710/7
5,377,051 A * 12/1994 Lane et al. .................... 386/81

(Continued)

FOREIGN PATENT DOCUMENTS

EP    1 085 709    3/2001

(Continued)

OTHER PUBLICATIONS

Heck P., et al., entitled "*Media Oriented Synchronous Transfer—A Network Protocol for High Quality, Low Cost Transfer of Synchronous, Asynchronous, and Control Data on Fiber Optic*", Preprints of Papers Presented at the AES Convention, XX, XXX, vol. 4551, No. 4551, Sep. 1997, pp. 1-10.

*Primary Examiner*—William Trost, IV
*Assistant Examiner*—Roberta A Shand
(74) *Attorney, Agent, or Firm*—Wenderoth, Lind & Ponack, L.L.P.

(57) ABSTRACT

Stream data and a command output from a drive device are individually packetized in a first packet processing unit. The stream data packet and the command packet are further multiplexed, and the multiplexed data is transmitted to a transmission path using a synchronous channel. When the command output from a decoding unit is packetized in a second packet processing unit, it is packetized by multiplexing flow control information output from the decoding unit, and is transmitted to the first packet processing unit using a synchronous channel of the transmission path. Based on this flow control information, reading/writing by the drive device is controlled.

16 Claims, 16 Drawing Sheets

U.S. PATENT DOCUMENTS

| | | | |
|---|---|---|---|
| 5,594,868 A * | 1/1997 | Nakagoshi et al. | 709/234 |
| 5,758,188 A * | 5/1998 | Appelbaum et al. | 710/35 |
| 5,787,073 A | 7/1998 | Ikeda | |
| 5,884,004 A * | 3/1999 | Sato et al. | 386/98 |
| 5,905,845 A * | 5/1999 | Okada et al. | 386/98 |
| 5,949,955 A * | 9/1999 | Nakai | 386/106 |
| 6,009,433 A * | 12/1999 | Kurano et al. | 1/1 |
| 6,246,402 B1 * | 6/2001 | Setogawa et al. | 715/723 |
| 6,385,387 B1 * | 5/2002 | Tanaka et al. | 386/94 |
| 6,408,005 B1 | 6/2002 | Fan et al. | |
| 6,609,167 B1 * | 8/2003 | Bastiani et al. | 710/104 |
| 6,618,788 B1 * | 9/2003 | Jacobs | 710/315 |
| 6,724,982 B1 * | 4/2004 | Hamlin | 386/125 |
| 6,865,188 B1 * | 3/2005 | Stirling et al. | 370/460 |
| 6,919,891 B2 * | 7/2005 | Schneider et al. | 345/440 |
| 7,120,404 B2 * | 10/2006 | Gierl | 455/132 |
| 7,127,149 B1 * | 10/2006 | Lin | 386/45 |
| 2001/0029446 A1 * | 10/2001 | Cho | 704/201 |
| 2001/0041062 A1 * | 11/2001 | Ottesen et al. | 386/125 |
| 2002/0032789 A1 * | 3/2002 | Bahren et al. | 709/230 |

FOREIGN PATENT DOCUMENTS

| | | |
|---|---|---|
| JP | 8-331129 | 12/1996 |
| JP | 9-149065 | 6/1997 |
| JP | 11-98155 | 4/1999 |

* cited by examiner

Fig. 5

|    | Receiving device → Sending device | Receiving device ← Sending device |
|----|-----------------------------------|-----------------------------------|
| C0 | reset                             | interrupt                         |
| C1 | data read (flow control)          | flow control                      |
| C2 | data error (re-sending request)   |                                   |
| C3 |                                   | data error                        |
| C4 | buffer clear                      | buffer clear                      |

Fig. 10

| Sync Byte | | | | | |
|---|---|---|---|---|---|
| Packet Type | C4 | C3 | C2 | C1 | C0 |
| reserved | | | | | |
| reserved | | | | | |
| ATAPI Command[0] | | | | | |
| ATAPI Command[1] | | | | | |
| ... | | | | | |
| ATAPI Command[11] | | | | | |

Fig. 11

| Sync Byte | | | | | |
|---|---|---|---|---|---|
| Packet Type | C4 | C3 | C2 | C1 | C0 |
| reserved | | | | | |
| reserved | | | | | |

Fig. 12A

| Sync Byte | | | | | |
|---|---|---|---|---|---|
| Packet Type | C4 | C3 | C2 | C1 | C0 |
| r | w | rsv | CS1 | CS0 | DA2 | DA1 | DA0 |
| Resister Value | | | | | |

Fig. 12B

| r | register value Read |
|---|---|
| w | register value Write |
| DA0~DA2, CS0, CS1 | register address |

Fig. 13

| Sync Byte | | | | | |
|---|---|---|---|---|---|
| Packet Type | C4 | C3 | C2 | C1 | C0 |
| reserved | | | | | |
| ATAPI Status | | | | | |
| ATAPI Error | | | | | |
| ATAPI Interrupt Reason | | | | | |
| ATAPI Byte Count (Bits 0-7) | | | | | |
| ATAPI Byte Count (Bits 8-15) | | | | | |

Fig. 14

| FRAME | Byte0 | Byte1 | Byte2 | Byte3 Byte4 Byte5 | Byte6 Byte7 | Byte8 | Byte9 | ... | Byte30 | Byte31 |
|---|---|---|---|---|---|---|---|---|---|---|
| a | SYNC for encryption | encryption control | Reserved | header | data length | Data[0] | Data[1] | ... | Data[22] | Data[23] |
| a+1 | Data | Data | Data | Data | Data | Data | Data | ... | Data | Data |
| ... | Data | Data | Data | Data | Data | Data | Data | ... | Data | Data |
| a+64 | Data | Data | Data | Data | Data | Data | Data | ... | Data[N] Reserved | Reserved |

801 area not to be encrypted 802 area to be encrypted

Register read

Register write

TRANSMISSION METHOD, SENDING DEVICE AND RECEIVING DEVICE

BACKGROUND OF THE INVENTION

1. Field of the Invention

The present invention relates to a transmission method of digital data typified by DVD-Video and others, and particularly to a transmission method of stream data or a command outputted from a stream data sending device, and a command or flow control information outputted from a stream data receiving device.

2. Description of the Related Art

There is a conventional method for transmitting data recorded on a CD (compact disk) or the like, called MOST (Media-Oriented Synchronous Transfer), for example. (References: Patric Heck, et al.: "Media Oriented Synchronous Transfer—A Network Protocol for High-Quality, Low-Cost transfer of Synchronous, Asynchronous, and Control Data on Fiber Optic", Presented at AES103rd Convention, 1997 September, Preprint 4551, or www.rnostcooperation.com)

The conventional data transmission method according to the MOST method will be explained below with reference to FIG. 1.

FIG. 1 is a diagram that shows a data structure of a frame in the MOST method.

According to the conventional transmission method, data is transmitted in a frame transmitted at 44.1 kHz, that is, every 22.67 microseconds. A data length of one frame is 512 bits. As shown in FIG. 1, one frame consists of a preamble 701, a boundary descriptor 702, a synchronous channel area 703, an asynchronous channel area 704, a control frame 705, a frame control data 706 and a parity 707. The frame cycle is not limited to 44.1 kHz, but may be 48 kHz. In the following explanation, the frame cycle is 44.1 kHz, for convenience.

Here, the preamble 701, the boundary descriptor 702, the synchronous channel area 703 in the frame will be explained, but the explanation of the asynchronous channel area 704, the control frame 705, the frame control data 706 and the parity 707 will be omitted because they are not directly related to the present invention.

The preamble 701 is data of 4 bits having a fixed pattern, and used for detecting a boundary of a frame in a sending device and a receiving device that transmit the data. The boundary descriptor 702 is data of 4 bits and is used for indicating the boundary between the synchronous channel area 703 and the asynchronous channel area 704.

The synchronous channel area 703 is data of 0~480 bits long, and its length is determined by the boundary descriptor 702. The synchronous channel area 703 is used for transmission of real time data such as voice data. Here, the real time data means the data with time constraints, and in transmission of that data, the transmission delay must be definable.

The synchronous channel area 703 is assigned to the sending device and the receiving device as a time slot. Up to 60 time slots can be used as a synchronous channel. The time slots used for transmission are assigned to the sending device and the receiving device in advance, and a group of time slots used for one transmission is defined as a logical channel. The sending device sends data using the assigned time slot, and the receiving device receives the data using the assigned time slot. In the MOST method, data transmission using one time slot corresponds to the data transmission at a speed of 352.8 kbps. In other words, five time slots are used in the synchronous channel area 703 in order to transmit data of a CD at a speed of 1.6122 Mbps.

A command or the response thereto is usually transmitted using the control frame 705.

In the conventional transmission method, the stream data is transmitted using the synchronous channel area 703, and the command is transmitted using the control frame 705. As for DVD (digital versatile disk)-Video, the disk includes compressed data under the standard of MPEG-2. Since the speed of reading out data by the drive device is generally higher than that of decoding the data by the decoding unit, flow control occurs in the drive device. Therefore, when the data of DVD-Video is transmitted via a network, the information on this flow control (hereinafter referred to as "flow control information") also needs to be transmitted.

However, the method for transmitting the flow control information is not determined in the MOST method, so the above flow control cannot be executed appropriately.

BRIEF DESCRIPTION OF THE INVENTION

The present invention is designed in view of the above problem, and the object of the present invention is to provide a transmission method that enables execution of flow control when the method of transmitting the flow control information is not determined (particularly in the MOST method). In addition, another object of the present invention is to provide a transmission method that enables use of a transmission bandwidth efficiently.

In order to achieve the above objects, the transmission method according to the present invention is a transmission method of transmitting stream data from a sending device to a receiving device using a digital transmission path having a first channel and a second channel, including: a first step for sending stream data from the sending device to the receiving device using the first channel; and a second step for sending, from the receiving device to the sending device using the second channel, a command including flow control information indicating an instruction to have the sending device start or stop sending of the stream data, wherein the second channel is a synchronous channel that can guarantee to send data within a certain time period of a transmission delay.

Accordingly, the flow control information is transmitted from the receiving device to the sending device by a synchronous channel, so the flow control information is transmitted to the sending device without fail and thereby the stream data can be transmitted stably.

Also, in order to achieve the above objects, the command according to the present invention has a header part including a synchronous code and a data part indicating a command, and in the second step, the flow control information is placed on the header part of the command.

Accordingly, the flow control information can be transmitted from the receiving device to the sending device by being multiplexed on the header of the packet, so there is an effect that the bandwidth of the digital transmission path can be used efficiently. Also, since the flow control information can be transmitted by being multiplexed on the header of the packet, there is an effect that the data can be transmitted to the drive device pursuant to ATA or ATAPI which is a similar transmission method.

Furthermore, in order to achieve the above objects, the transmission method according to the present invention further includes a third step of sending the command from the sending device to the receiving device, wherein the command sent in the third step has a header part including a synchronous code and a data part indicating a command.

Accordingly, the command can be sent from the sending device to the receiving device, so the data can be transmitted from the sending device to the receiving device by interruption and thereby the stream data can be transmitted more flexibly.

Also, in order to achieve the above objects, the sending device according to the present invention is a sending device that sends stream data to a receiving device using a digital transmission path having a first channel and a second channel, comprising: a buffer unit operable to temporarily hold stream data to be sent; a stream data sending unit operable to read the stream data from the buffer unit, and send the stream data to the receiving device using the first channel; and a control unit operable to receive flow control information sent from the receiving device using the second channel, and start or stop an operation of the stream data sending unit based on the received flow control information, wherein the second channel is a synchronous channel that can guarantee to send data within a certain time period of a transmission delay.

Accordingly, the sending device controls sending of the stream data based on the flow control information sent from the receiving device. Thus, the data can be transmitted using the bandwidth of the transmission path efficiently.

In addition, in order to achieve the above objects, the receiving device according to the present invention is a receiving device that receives stream data sent from a sending device using a digital transmission path having a first channel and a second channel, comprising: a receiving unit operable to receive stream data sent from the sending device using the first channel; a buffer unit operable to temporarily hold the received stream data; and a sending unit operable to send, to the sending device using the second channel, a command including flow control information indicating an instruction to have the sending device start or stop sending of the stream data, based on amount of the stream data stored in the buffer unit, wherein the second channel is a synchronous channel that can guarantee to send data within a certain time period of a transmission delay.

Accordingly, the receiving device sends the flow control information to the sending device depending upon its own receiving capability and controls sending of the stream data based on the flow control information, so the data can be transmitted using the bandwidth of the transmission path efficiently.

Note that, in order to achieve the above objects, the present invention can be realized as a program having a computer execute all the characteristic steps of the transmission method. And the program cannot only be stored in a ROM and others of the transmission device, but also distributed via a recording medium such as a CD-ROM and a transmission medium such as a communication network.

BRIEF DESCRIPTION OF DRAWINGS

These and other subjects, advantages and features of the invention will become apparent from the following description thereof taken in conjunction with the accompanying drawings that illustrate a specific embodiment of the invention. In the Drawings:

FIG. 5 is a diagram that shows an actual example of control signal information of the command packet according to the present embodiment.

FIG. 10 is a structure example of an ATAPI command packet according to the present embodiment.

FIG. 11 is a structure example of a NULL packet which is one of the command packets according to the present embodiment.

FIG. 12A is a structure example of a register packet according to the present embodiment.

FIG. 12B is a diagram for explaining a data structure of the register packet in FIG. 12A.

FIG. 13 is a structure example of a status packet according to the present embodiment.

FIG. 14 is a diagram for explaining a stream data packet according to the present embodiment.

DETAILED DESCRIPTION OF THE INVENTION

The following is a detailed explanation of the transmission device according to the embodiment of the present invention with reference to the figures.

Figure 2:
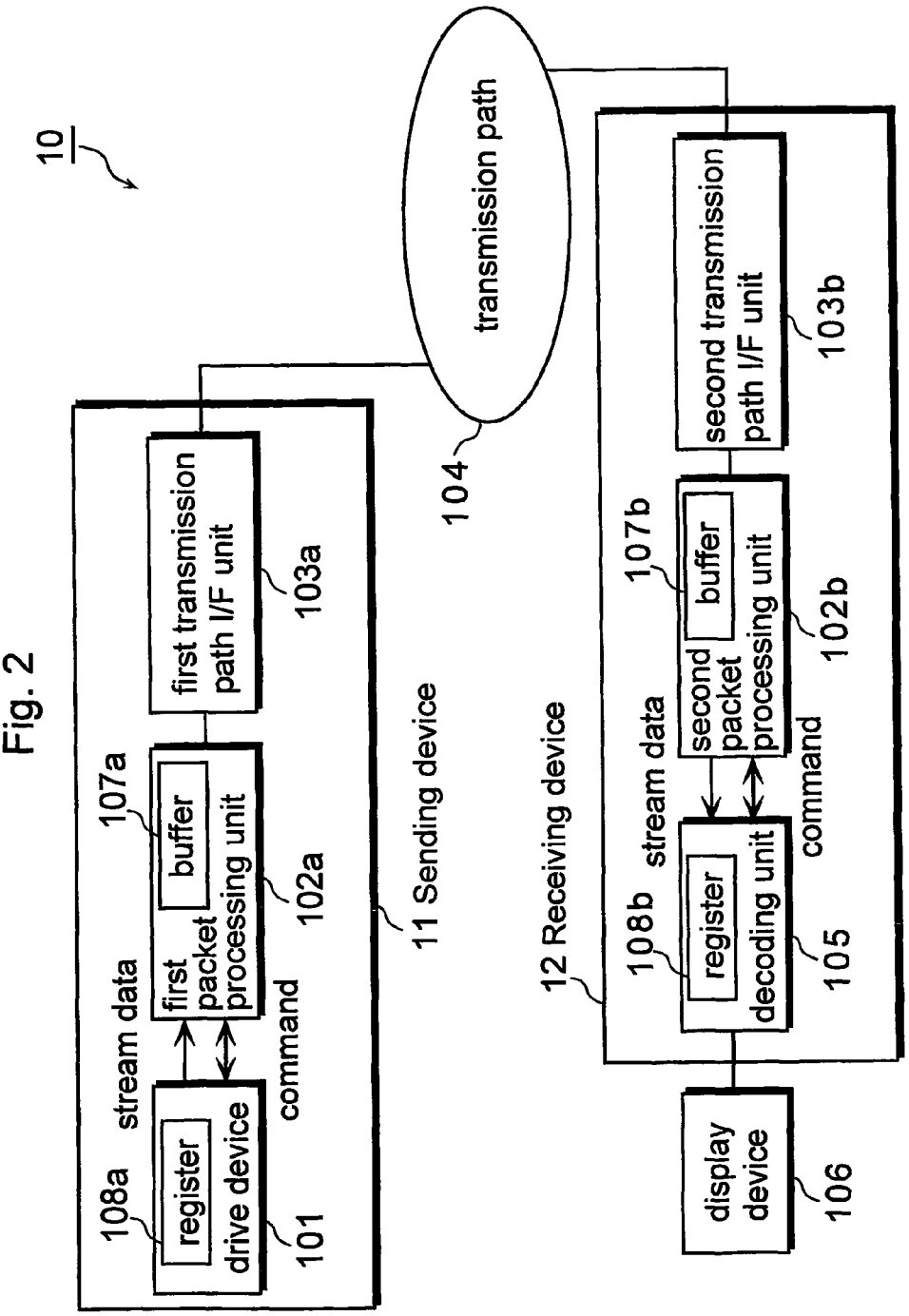
FIG. 2 is a diagram that shows an example of the transmission device according to the present embodiment.

FIG. 2 is a diagram that shows an example of the transmission device 10 according to the present embodiment. As shown in FIG. 2, the transmission device 10 includes a sending device 11, a receiving device 12, a transmission path 104 connecting the sending device 11 and the receiving device 12, and a display device 106.

The sending device 11 has a drive device 101, a first packet processing unit 102a, and a first transmission path I/F unit 103a.

The drive device 101 reads data from a disk such as a DVD medium.

The first packet processing unit 102a packetizes the stream data read by the drive device 101 or the command outputted from the drive device 101, or receives the packet transmitted via the transmission path 104 and outputs it to the drive device 101 as a command. Here, the stream data means all kinds of data such as videos and sounds recorded on a recording medium, etc. These data is read out and outputted from the drive device 101 as stream data.

The first transmission path I/F unit 103a outputs the packet generated in the first packet processing unit 102a to the transmission path 104 in accordance with the interface of the transmission path 104, or fetches the packet from the frame in accordance with the interface of the transmission path 104 and outputs it to the first packet processing unit 102*a*.

The receiving device 12 has a decoding unit 105, a second packet processing unit 102*b* and a second transmission path I/F unit 103*b*.

The decoding unit 105 decodes data compressed by a compression means such as MPEG-2 recorded on a DVD medium or the like.

The second packet processing unit 102*b* packetizes the command outputted from the decoding unit 105, or receives the packet transmitted via the transmission path 104 and recognizes it, and outputs it to the decoding unit 105 as stream data or a command.

The second transmission path I/F unit 103*b* outputs the packet generated in the second packet processing unit 102*b* to the transmission path 104 in accordance with the interface of the transmission path 104, and further fetches the packet from the frame in accordance with the interface of the transmission path 104 and outputs it to the second packet processing unit 102*b*.

The drive device 101 includes a register 108*a* such as an ATA register (the present embodiment will be explained on the assumption that the register 108*a* is an ATA register). The decoding unit 105 includes a register 108*b* that can hold the contents of the register 108*a* of the drive device 101. Furthermore, the first packet processing unit 102*a* and the second packet processing unit 102*b* respectively include a buffer 107*a* and a buffer 107*b* of several dozen k bytes~several hundred k bytes, for instance, used for sending and receiving data of DVD or the like. The size of the buffer 107*a*, 107*b* is not to be limited to the above size. The first packet processing unit 102*a* and the second packet processing unit 102*b* respectively determine whether the data stored in the buffer 107*a* and the buffer 107*b* has reached a predetermined value a or more, or a predetermined value b or less.

The transmission path 104 connecting the sending device 11 and the receiving device 12 has at least a synchronous channel area for transmitting digital data. The transmission path 104 in the present embodiment is a transmission path pursuant to the standard of the MOST method having the synchronous channel area and the asynchronous channel area as described above. (The transmission path 104 is not limited to that in the MOST method, but may be an arbitrary transmission path having a synchronous channel such as IEEE1394 or USB, for which a certain standard of a transmission bandwidth or delay can be defined). The packet generated in the first packet processing unit 102*a* or the second packet processing unit 102*b* is transmitted using the synchronous channel area 703 of the transmission path 104.

The display device 106 receives the data decoded by the decoding unit 105 and displays it, and is constructed using an arbitrary display method such as CRT, liquid crystal or plasma.

Furthermore, the decoding unit 105 controls the drive device 101 via the transmission path 104 according to a command. For example, by sending a command "Read" (as an example of a command for requesting stream data) from the decoding unit 105, the drive device 101, upon receiving this command, reads the stream data from a DVD-Video medium and has the decoding unit 105 send it.

Here, the decoding unit 105 controls the drive device 101 using an ATAPI command as a command for controlling the drive device 101. As for the interface between the drive device 101 and the first packet processing unit 102*a* and the interface between the decoding unit 105 and the second packet processing unit 102*b*, the stream data and the command are described separately. The ATAPI command is transmitted by these interfaces. Or they may be the interfaces like ATA by which the multiplexed stream data and command are sent via the same bus. In this case, the first packet processing unit 102*a* and the second packet processing unit 102*b* perform separation between the stream data and the command, multiplexing of them or interface processing of them. ATAPI and ATA are standards. ATAPI and ATA are standardized as (T13D 1321D AT Attachment with Packet Interface 5), and the DVD control command under the ATAPI is standardized as (SFF Committee Information Specification for ATAPI DVD Device Rev 4.0 Feb. 10, 2000).

Next, transmission of a command packet and a stream data packet will be explained using FIG. 3. Here, the command packet means a packet including the command which is packetized in the first packet processing unit 102*a* or the second packet processing unit 102*b*. The stream data packet means a packet including the stream data which is packetized in the first packet processing unit 102*a* or the second packet processing unit 102*b*.

Figure 3:
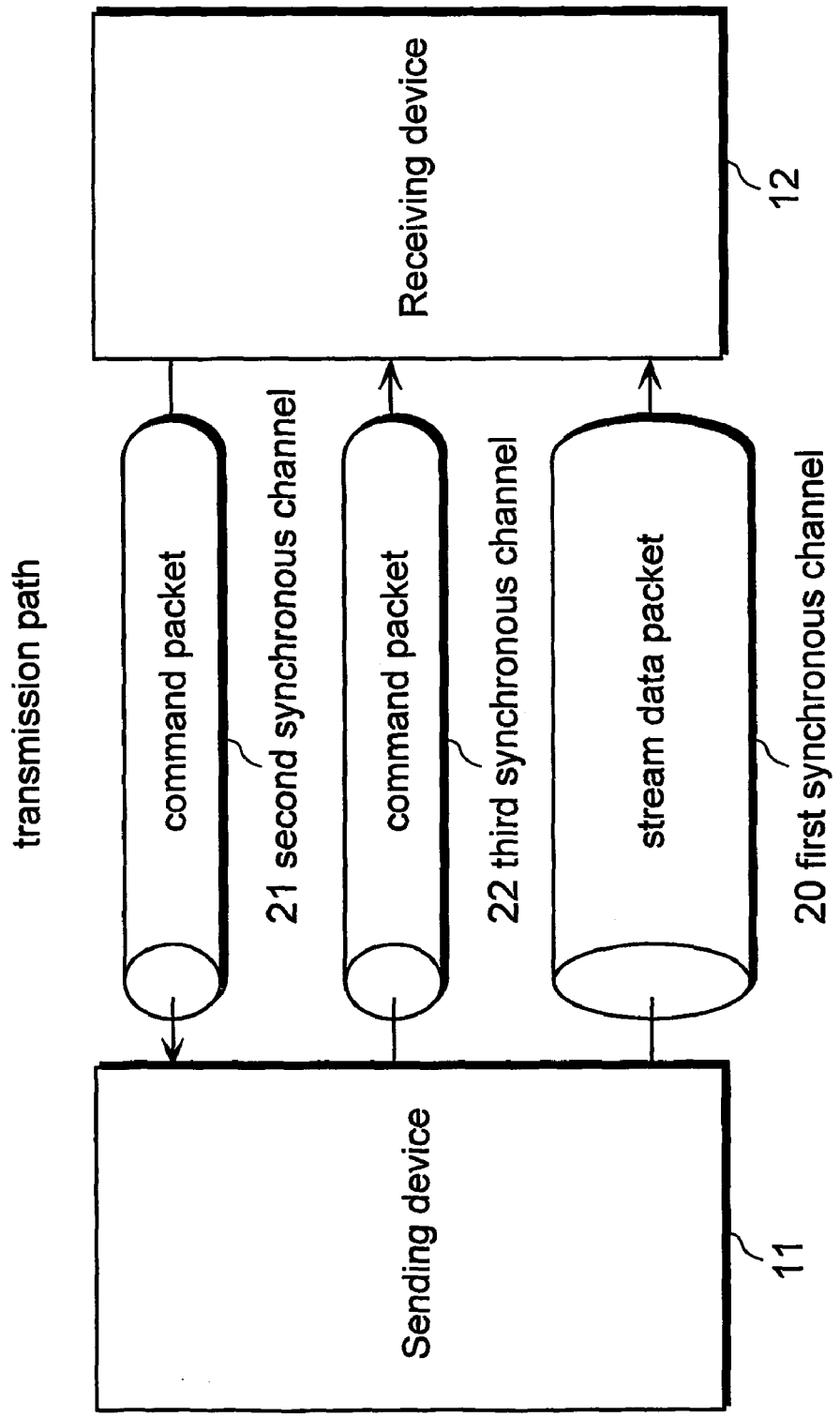
FIG. 3 is a diagram for explaining the transmission method according to the present embodiment.

As shown in FIG. 3, the command packet and the stream data packet are transmitted via different synchronous channels. For example, the receiving device 12 sends the command packet to the sending device 11 using the second synchronous channel 21. The sending device 11 sends the command packet to the receiving device 12 using the third synchronous channel 22. And the sending device 11 sends the stream data packet to the receiving device 12 using the first synchronous channel 20.

The synchronous channel 21 and the synchronous channel 22 for sending the command packet require the bandwidth of approximately several tens of kbps~several hundred kbps. The synchronous channel 20 for sending the stream data packet requires the bandwidth of 11.08 Mbps or more for DVD. The bandwidth is not to be limited to the above bandwidth, and it may be specified for each type of media. Also, the synchronous channel 22 and the synchronous channel 20 may be integrated into one channel and the multiplexed command packet and stream data packet may be sent via the channel. However, in the following explanation, they are sent separately, if there is no specific description.

Figure 4:
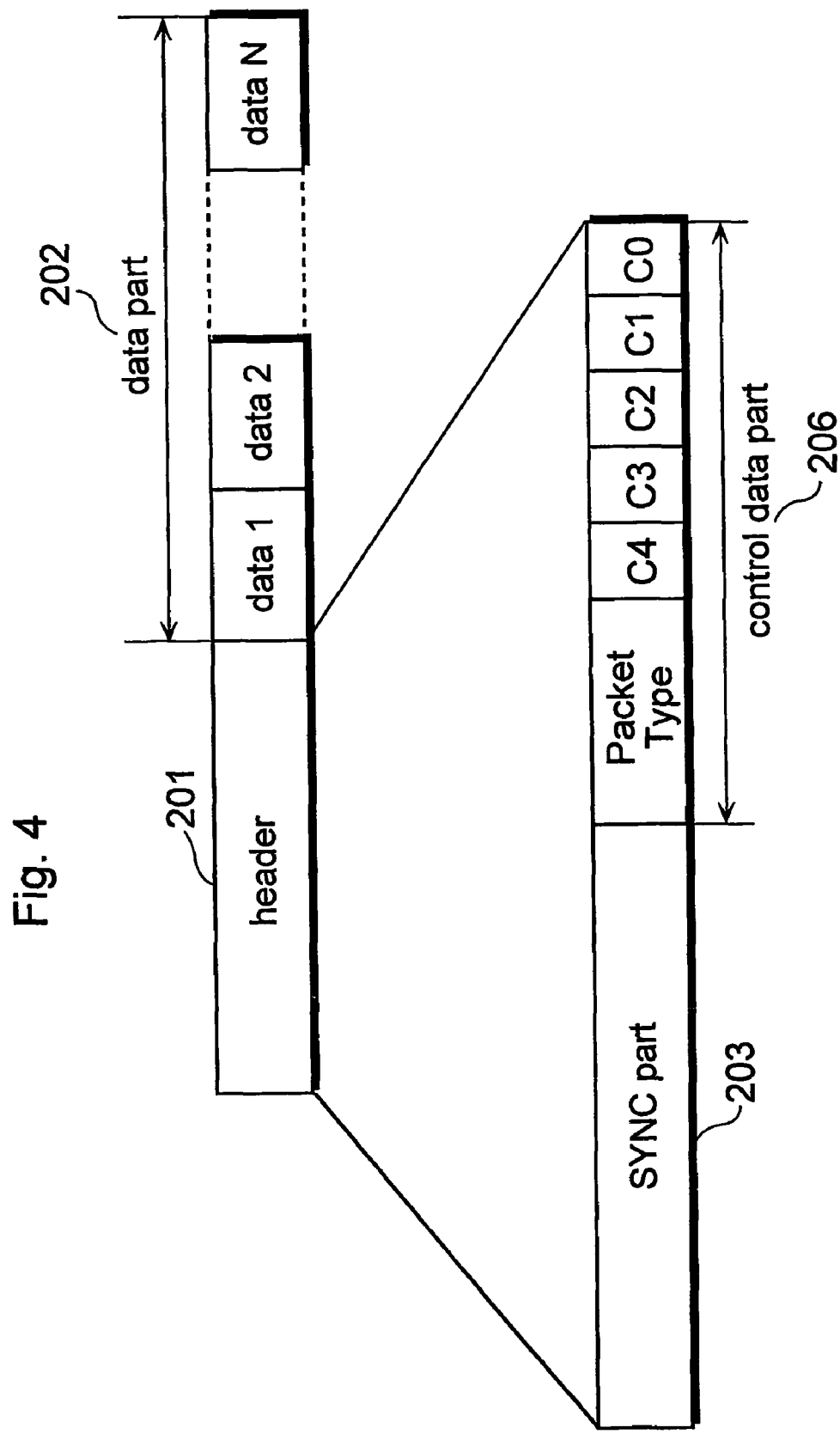
FIG. 4 is an example of a command packet format according to the present embodiment.

Next, an example of a command packet format used in the present embodiment is shown in FIG. 4. This packet consists of a header 201 and a data part 202. The header 201 consists of an SYNC part 203 and a control data part 206. In the SYNC part 203, codes for synchronizing transmission of packets are stored. The control data part 206 consists of a packet type indicating a packet type and control signal information (C0~C4) required for the operations of the driver and the decoder. This control signal information is an example of the flow control information according to the present invention, and is used for controlling the data transmission flow requiring immediacy. At least the flow control information of DVD-Video is transmitted using this control data part 206.

FIG. 5 is a diagram that shows an actual example of the above control signal information. Here, C0 is transmitted from the receiving device 12 to the sending device 11 as a reset instruction of the drive device 101. C0 is also transmitted from the sending device 11 to the receiving device 12 as an interrupt signal (a notice which is given when an operator of the drive device 101 makes an operation entry, for instance).

C1 is a flow control signal, and used when the receiving device 12 instructs the sending device 11 to send and stop sending data. For example, it is predetermined that "H" and "L" indicate "Wait" and "Ready" respectively, and the receiving device 12 gives the instruction based on these. C1 is also used when the sending device 11 gives the instruction to the receiving device 12. For example, since the stream data is sent from the receiving device 12 to the sending device 11 if the drive device 101 of the sending device 11 is a recording device such as a DVD-RAM or a DVD-R, C1 is used for the flow control in that case. Likewise, it is predetermined that "H" and "L" indicate "Busy" and "Ready" respectively, and the sending device 11 gives the instruction based on these.

C3 is a signal used when a data error occurs in transferring data. For example, when an error occurs in reading out data and resending is requested, C3 is used by setting at "H".

C4 is a signal for instructing buffer clear, and used for instructing to clear the data held in the buffers 107a, 107b of the first and second packet processing units 102a, 102b. The allocation of these control signals is, of course, not limited to that of FIG. 5, and a part of these signals may be used for the control. Furthermore, an area corresponding to a signal line for ATA that transmits a control signal for DMA such as DMA Stop, DMA ACK or DMA Req, which are not shown in FIG. 5, may be set for exchanging the signal, and used for the control.

Figure 6:
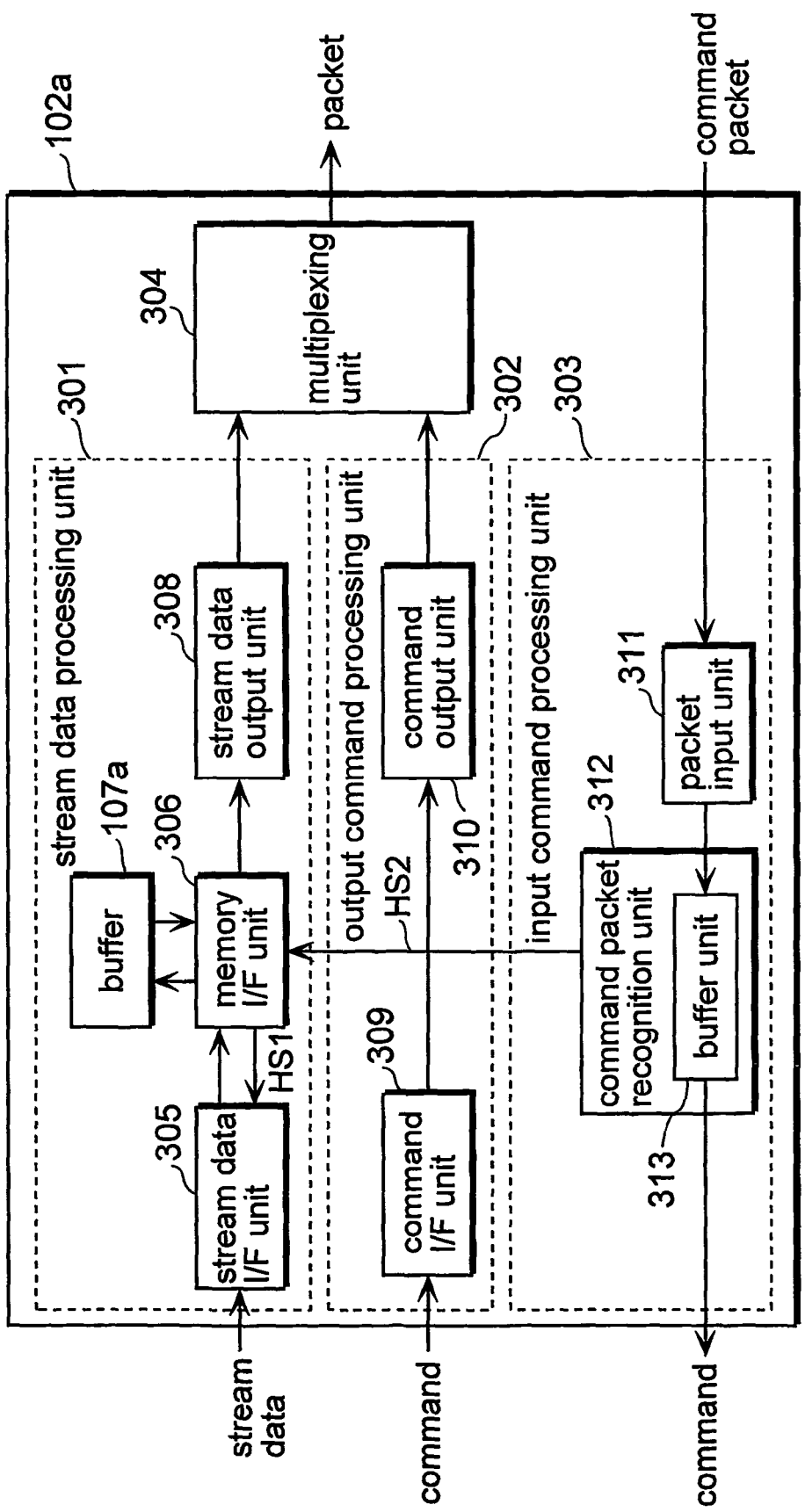
FIG. 6 is a diagram that shows a structure example of a first packet processing unit according to the present embodiment.
Figure 7:
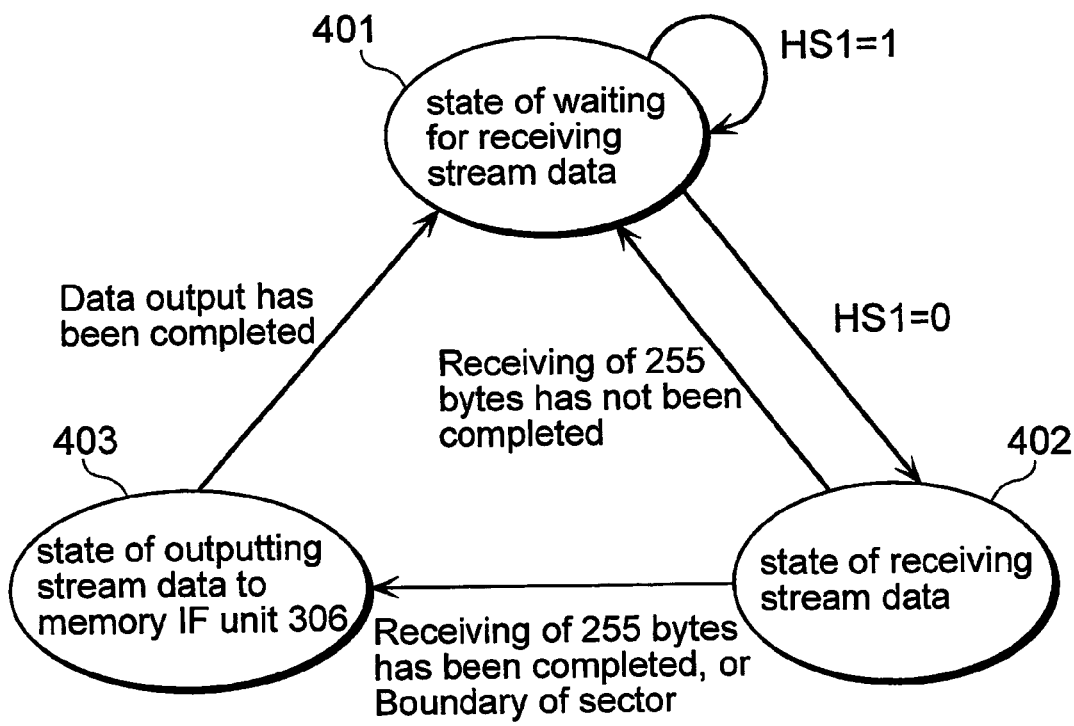
FIG. 7 is a diagram that shows a state transition of a stream data I/F unit of the first packet processing unit in FIG. 6.
Figure 8:
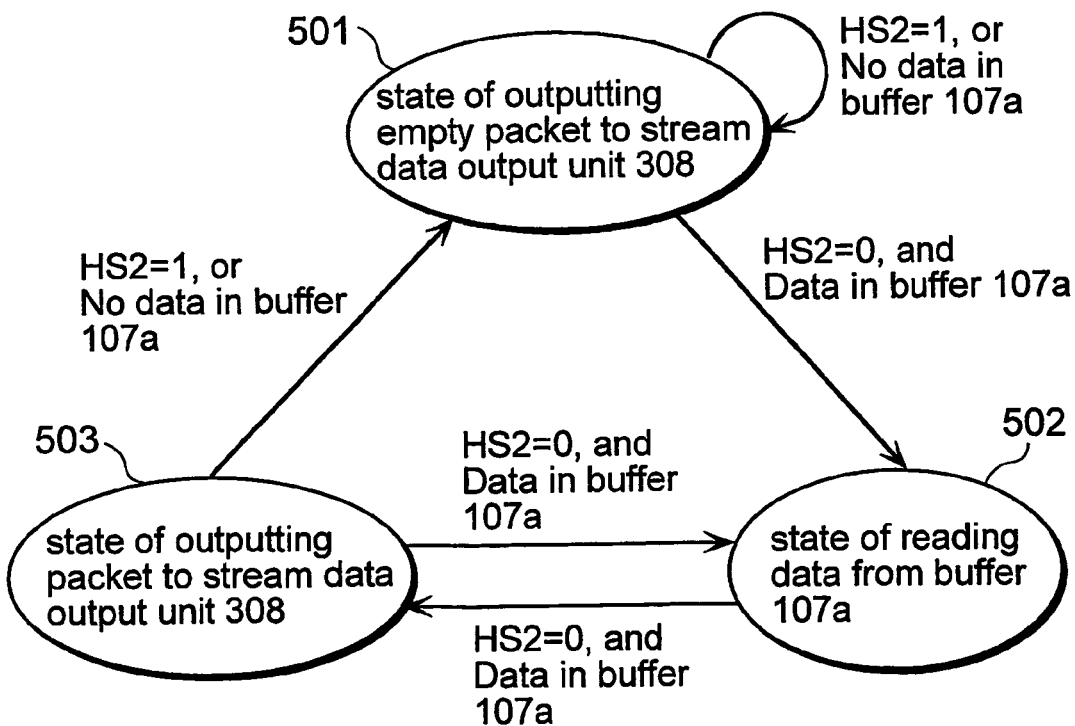
FIG. 8 is a diagram that shows a state transition of a memory I/F unit of the first packet processing unit in FIG. 6.

Next, a structure of the above-mentioned first packet processing unit 102a will be explained using FIGS. 6~8. FIG. 6 is a diagram that shows a structure example of the first packet processing unit 102a according to the present embodiment. FIG. 7 is a diagram that shows a state transition of the stream data I/F unit 305 in the first packet processing unit 102a. FIG. 8 is a diagram that shows a state transition of the memory I/F unit 306 in the first packet processing unit 102a.

In FIG. 6, the first packet processing unit 102a includes a stream data processing unit 301 that processes the stream data received from the drive device 101, an output command processing unit 302 that processes the command received from the drive device 101, an input command processing unit 303 that processes the command transmitted from the decoding unit 105 via the transmission path 104, and a multiplexing unit 304 that multiplexes the stream data packet generated by the stream data processing unit 301 and the command packet generated by the output command processing unit 302.

First, the stream data processing unit 301 will be explained. The stream data processing unit 301 includes a stream data I/F unit 305, a memory I/F unit 306, a buffer 107a and a stream data output unit 308.

The stream data I/F unit 305 receives the stream data outputted from the drive device 101, and outputs it to the memory I/F unit 306. The stream data I/F unit 305 receives the stream data according to the interface of the drive device 101. Also, the stream data I/F unit 305 receives the flow control signal from the memory I/F unit 306, and confirms whether or not it is to receive the stream data based on the flow control signal. When this flow control signal is HS1 and HS1 is "0", the stream data I/F unit 305 receives the stream data, and when HS1 is "1", it stops receiving the stream data. In summary, the stream data I/F unit 305 does not receive the stream data from the drive device 101 when the signal HS1 is "1".

Here, an example of the state transition in the stream data I/F unit 305 will be explained using FIG. 7. FIG. 7 shows three states to which the stream data I/F unit 305 can transition: a state 401 of waiting for receiving stream data, a state 402 of receiving stream data and a state 403 of outputting stream data to the memory I/F unit 306.

The stream data I/F unit 305 starts from the state 401 of waiting for receiving stream data outputted from the drive device 101. In this state 401, when the signal HS1 outputted from the memory I/F unit 306 is "0", the stream data I/F unit 305 transitions to the state 402 of receiving the stream data, and when the signal HS1 is "1", it keeps the state 401. When the signal HS1 became "1" and the stream data I/F unit 305 received the stream data from the drive device 101, but the stream data I/F unit 305 has not received the stream data for the maximum value of the data part 202 of the packet (255 bytes, for instance) in FIG. 4, it transitions to the state 401 again.

On the other hand, when the stream data I/F unit 305 has received the stream data for the maximum value of the data part 202 of the packet, it transitions to the state 403 of outputting the stream data to the memory I/F unit 306. As for DVD, since the data is recorded by sector, a new packet is generated when the boundary between the sectors is detected. The stream data I/F unit 305 also transitions to the state 403 in this case. And when the output of the stream data from the stream data I/F unit 305 to the memory I/F unit 306 has been completed, it transitions to the state 401.

In this manner, the stream data I/F unit 305 executes the flow control using the flow control signal HS1. The memory I/F unit 306 outputs the packetized data to the stream data output unit 308 while writing the stream data received from the stream data I/F unit 305 into the buffer 107a.

Also, the memory I/F unit 306 manages the data amount in the buffer 107a. When the free space of the buffer 107a becomes a predetermined value or less, the memory I/F unit 306 notifies the stream data I/F unit 305 of that effect with a flow control signal. This flow control signal corresponds to the above-mentioned HS1.

Furthermore, the memory I/F unit 306 receives the flow control signal from the command packet recognition unit 312, and determines whether or not it is to receive the stream data based on the flow control signal. When this flow control signal is HS2 and HS2 is "0", it receives the stream data, and when HS2 is "1", it does not receive the stream data. In summary, when the signal HS2 is "1", the memory I/F unit 306 outputs an empty packet without the data part 202 (NULL packet) to the stream data output unit 308, and when the signal HS2 is "0", it reads out the stream data from the buffer 107a, packetizes it, outputs it to the stream data output unit 308.

Here, an example of the state transition of the memory I/F unit 306 will be explained using FIG. 8. FIG. 8 shows three states to which the memory I/F unit 306 can transition: a state 501 of outputting an empty packet to the stream data output unit 308, a state 502 of reading data from the buffer 107a, and a state 503 of outputting packet to the stream data output unit 308.

The memory I/F unit 306 starts from the state 501 of outputting an empty packet (NULL packet) to the stream data output unit 308. In this state 501, when the signal HS2 is "1" or there is no data in the buffer 107a, the memory I/F unit 306 keeps the state 501, and when the signal HS2 is "0" and there is data in the buffer 107a, it transitions to the state 502 of reading out the data from the buffer 107a.

In the state 502, the memory I/F unit 306 reads out data from the buffer 107a, packetizes the read-out data, and transitions to the state 503 of outputting the packet to the stream data output unit 308.

In the state 503, the memory I/F unit 306 outputs the packet to the stream data output unit 308, and then transitions to the state 502 again when the signal HS2 is "0" and the there is data in the buffer 107a. On the other hand, it transitions to the state 501 when the signal HS2 is "1" or there is no data in the buffer 107a.

In this manner, the memory I/F unit 306 executes the flow control based on the flow control signal and whether or not there is data in the buffer 107a.

After that, the stream data output unit 308 receives the packet from the memory I/F unit 306 and outputs it to the multiplexing unit 304.

Next, the output command processing unit 302 will be explained. The output command processing unit 302 includes a command I/F unit 309 and a command output unit 310.

The command I/F unit 309 receives the command outputted from the drive device 101, packetizes it, and outputs it to the command output unit 310. It receives the command in accordance with the interface of the drive device 101. The packet as shown in FIG. 4 is used in this case. Also, when the command I/F unit 309 has not received the command, it outputs an empty packet (or "NULL packet") to the command output unit 310. The command output unit 310 receives the packet from the command I/F unit 309, and outputs it to the multiplexing unit 304.

Next, the input command processing unit 303 will be explained. The input command processing unit 303 includes a packet input unit 311 and a command packet recognition unit 312.

The packet input unit 311 receives a packet from the first transmission path I/F unit 103*a*, and outputs it to the command packet recognition unit 312. The command packet recognition unit 312 receives the packet from the packet input unit 311, and judges whether or not the packet includes data. When the packet includes data, it writes the data into the buffer unit 313. The data written in the buffer 313 is outputted to the drive device 101 in accordance with the interface of the drive device 101. Also, when the received packet includes a flow control signal, the command packet recognition unit 312 notifies the memory I/F unit 306 of the information of the flow control signal.

As described above, the packet outputted from the first packet processing unit 102*a* is sent to the first transmission path I/F unit 103*a*, and the first transmission path I/F unit 103*a* outputs that data to the transmission path 104.

Figure 1:
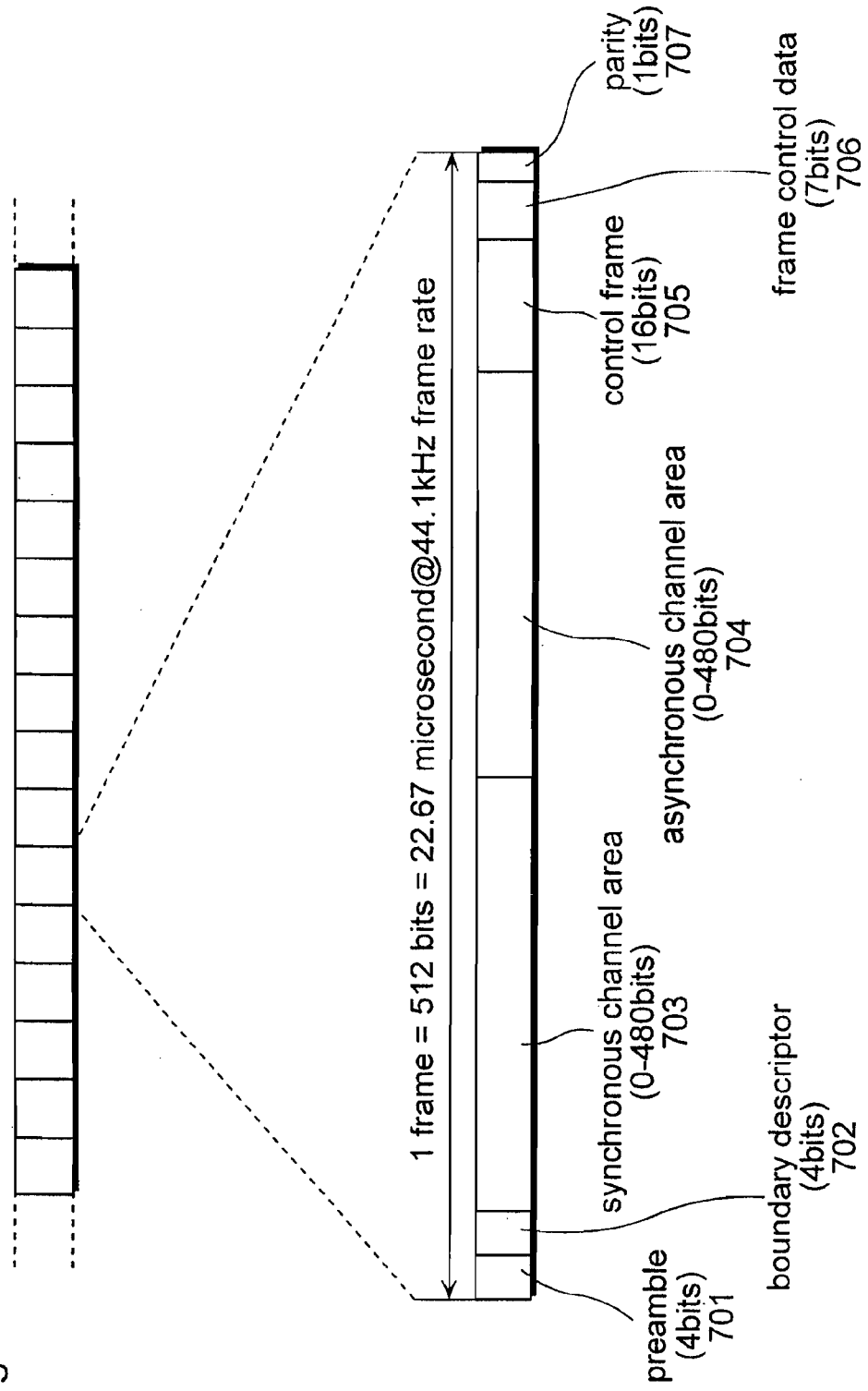
FIG. 1 is a diagram that shows a data structure of a frame in the MOST method.

In the case of MOST method, the first transmission path I/F unit 103*a* allocates the above-mentioned packet to the synchronous channel area 703 of the frame as shown in FIG. 1, and outputs it according to the allocation. A bandwidth of a fixed transmission speed is allocated to the synchronous channel area 703. In this case, a bandwidth of at least 11.08 Mbps is allocated, and the multiplexed stream data packet and the command packet are transmitted via the transmission path 104. When there is no data to be transmitted, an empty packet (NULL packet) including no data is transmitted.

In the MOST method, transmission is performed via the transmission path 104 by frame as shown in FIG. 1. In the present embodiment, since the stream data and the command are respectively packetized and multiplexed into the same frame by the first packet processing unit 102*a*, as described above, they can be transmitted in the synchronous channel area. Since the flow control information is also multiplexed into the command packet, it can be transmitted in the synchronous channel area.

Upon receiving the packet from the transmission path 104, the second transmission path I/F unit 103*b* outputs the packet to the second packet processing unit 102*b*. The second transmission path I/F unit 103*b* also outputs the packet received from the second packet processing unit 102*b* to the transmission path 104 according to the interface thereof.

Here, the structure of the second packet processing unit 102*b* will be explained.

The second packet processing unit 102*b* packetizes the command in the packet format as shown in FIG. 4 and outputs it to the second transmission path I/F unit 103*b*. The second packet processing unit 102*b* further receives the packet transmitted via the transmission path 104 and outputs it to the decoding unit 105.

The second packet processing unit 102*b* has a buffer, which can hold the received data. The packet which the second packet processing unit 102*b* receives includes the stream data packet and the command packet. Therefore, the stream data packet is to be processed by the stream data processing unit 301, and the command packet is to be processed by the input command processing unit 303.

The second packet processing unit 102*b* does not packetize the stream data but packetizes the command only. Here, the command means a command, a parameter necessary for executing the command and others. Note that the above-mentioned packetizing of the command is performed in the same manner as that performed in the first packet processing unit 102*a*.

Furthermore, the second packet processing unit 102*b* generates a flow control signal indicating whether or not the data is to be received based on free space of a buffer provided for storing the stream data. In other words, when the free space of the buffer becomes a predetermined value or less, the second packet processing unit 102*b* notifies the first packet processing unit 102*a* that receiving of the data is to be stopped. Also, when a packet format is same as that of FIG. 4, this flow control information is multiplexed into the control data part 206.

Figure 9:
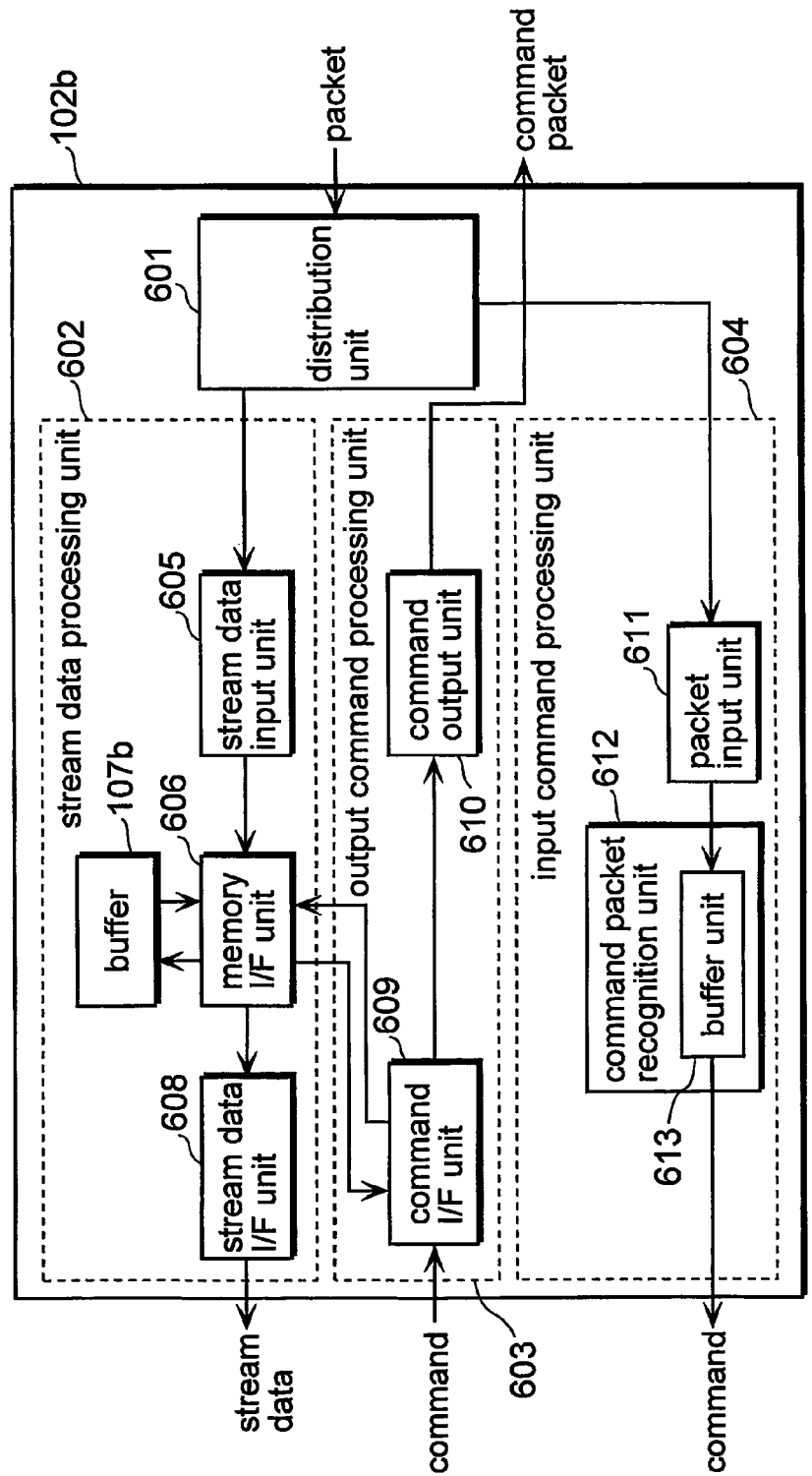
FIG. 9 is a diagram that shows a structure example of a second packet processing unit according to the present embodiment.

In the following, the structure of the above-mentioned second packet processing unit 102*b* will be explained. FIG. 9 is a diagram that shows a structure example of the second packet processing unit 102*b* according to the present embodiment.

In FIG. 9, the second packet processing unit 102*b* includes a distribution unit 601 that distributes the multiplexed packet received from the first packet processing unit 102*a*, a stream data processing unit 602 that processes the stream data packet distributed by the distribution unit 601, an output command processing unit 603 that processes the command received from the decoding unit 105, and an input command processing unit 604 that processes the command packet distributed by the distribution unit 601.

First, the distribution unit 601 receives the packet from the second transmission I/F unit 103*b*, and distributes the packet into the stream data packet and the command packet. Then, the distribution unit 601 outputs the stream data packet to the stream data processing unit 602, and the command packet to the input command processing unit 604.

Next, the stream data processing unit 602 will be explained. The stream data processing unit 602 includes a stream data input unit 605, a memory I/F unit 606, a buffer 107*b* and a stream data I/F unit 608.

The stream data input unit 605 outputs the stream data packet received from the distribution unit 601 to the memory I/F unit 606, and the memory I/F unit 606 fetches the necessary information from the received packet and writes it in the buffer 107*b*. When the memory I/F unit 606 receives the request from the stream data I/F unit 608, it reads out the data from the buffer 107*b*, and outputs the data to the stream data I/F unit 608.

Furthermore, the memory I/F unit 606 manages the data amount of the buffer 107*b*. When the free space of the buffer 107*b* becomes a predetermined value or less, the memory I/F unit 606 notifies the first processing unit 102*a* of it using a flow control signal. This flow control signal corresponds to the signal HS2 as mentioned above. Accordingly, the memory I/F unit 606 multiplexes this flow control signal into the command packet, and outputs it to the command I/F unit 609.

As for the control of the buffer 107b by the memory I/F unit 606, it does not output the stream data until a certain amount of the stream data is accumulated in the buffer 107b. Thereby, a special reproduction such as fast-forward can be realized. Also, as for the transmission of the stream data, since the buffer 107b regulates the data amount to be transmitted even if the transmission speed is limited due to the bandwidth of the transmission path 104, it is possible to continue the communication within the limit of that speed.

Furthermore, the buffer 107b clears the stored data in response to a clear instruction or a certain command outputted from the decoding unit 105. The command outputted from the decoding unit 105 is detected by the command I/F unit 609 of the second packet processing unit 102b and notified to the memory I/F unit 606.

The stream data I/F unit 608 outputs the stream data received from the memory I/F unit 606 to the decoding unit 105 according to the interface of the decoding unit 105.

Next, the output command processing unit 603 will be explained.

The output command processing unit 603 includes a command I/F unit 609 and a command output unit 610. Their basic operation is same as that of the output command processing unit 302 of the first packet processing unit 102a, as shown in FIG. 6.

The command I/F unit 609 receives the command outputted from the decoding unit 105, packetizes it and outputs it to the command output unit 610. This receiving of the command is performed in consideration of the interface of the decoding unit 105. The format of the packet generated here is same as that as shown in FIG. 4. When the command I/F unit 609 does not receive the command from the decoding unit 105, it outputs an empty packet (NULL packet) to the command output unit 610.

Also, the command I/F unit 609 receives the flow control signal HS2 from the memory I/F unit 606 of the stream data processing unit 602, as mentioned above. The command can be multiplexed if this signal HS2 is written into the control data part 206 of the packet header.

Furthermore, the command I/F unit 609 detects whether there is a command of clearing the data stored in the buffer 107b, as mentioned above. When the command I/F unit 609 detects such a command, it notifies the buffer 107b so as to clear the data in the buffer 107b.

Then, the command output unit 610 receives the packet from the command I/F unit 609, and outputs it to the second transmission path I/F unit 103b.

Next the input command processing unit 604 will be explained.

The input command processing unit 604 includes a packet input unit 611 and a command packet recognition unit 612.

The packet input unit 611 receives the command packet from the distribution unit 601, and outputs it to the command packet recognition unit 612. The command packet recognition unit 612 judges whether or not the packet received from the packet input unit 611 includes data, and when it judges that the data is included, writes the data in the buffer unit 613. The data written in the buffer unit 613 is outputted to the decoding unit 105 according to the interface of the decoding unit 105.

The decoding unit 105 decodes the stream data sent from the drive device 101 via the transmission path 104 according to MPEG-2 or the like. The decoded data is outputted to the display device 106. The display device 106 makes a display based on the digital data received from the decoding unit 105. Note that the display device 106 corresponds to a display screen for the image data and a loudspeaker for the sound data.

Meanwhile, the decoding unit 105, upon receiving the data from the drive device 101, outputs the command and the flow control information to the drive device 101 based on the decoding condition of the data. These data is packetized in the second packet processing unit 102b, as mentioned above, and outputted to the drive device 101 via the transmission path 104. Here, the command means a command, a parameter in the command, and others, and the transmission of the command requires a bandwidth of several dozen kbps.

In the following, structure examples of the other command packets than that as shown in FIG. 4 will be explained in detail using FIGS. 10~13. Each packet is identified with a value of a packet type in the control data part 206 in FIG. 4.

FIG. 10 is a structure example of an ATAPI command packet that transmits an ATAPI command. As shown in FIG. 10, ATAPI command of 12 bytes (ATAPI Command[0] ~ATAPI Command[11]) is transmitted using the data part 202 of FIG. 4. Note that the structure of the ATAPI packet is not limited to this, but it may be an arbitrary structure that enables to transmit the ATAPI command of 12 bytes.

FIG. 11 is an example of a NULL packet. The NULL packet is transmitted when the ATAPI command is transmitted, the data of the register is read or written, or there is no need to notify of the status. By doing so, the command packet which bursts out can be transmitted via the synchronous channel. Since the synchronous channel is secured in the present embodiment, this NULL packet is necessary.

FIG. 12A is a structure example of a register packet for writing in and reading out from a register. FIG. 12B is a diagram for explaining the meaning of each bit in FIG. 12A. In FIGS. 12A and 12B, "r" (in the case of "H", for instance) indicates a packet for reading out a register value, and "w" (in the case of "H", for instance) indicates a packet for writing it in the register. DA0~DA2 and CS0, CS1 indicate addresses of the registers which are read out and written in. For example, when r, CS0, CS1, DA0~DA2 are "H", "H", "L", "H", "H", "H", respectively, "reading out from a status register" is indicated.

The meaning and address of each register are described in the specifications of ATA/ATAPI. According to these specifications, the value of the register 108a or the register 108b can be read and written. The structure of the register packet is not limited to that shown in FIG. 12A, but it may be an arbitrary structure that enables to transmit whether a register is read from or written in, an address of the register which is written in or read from, and a value to be written in the register.

FIG. 13 is an example of a status packet for transmitting the status of the register 108a of the drive device 101. ATAPI Status, ATAPI Error, ATAPI Interrupt Reason, ATAPI Byte Count respectively correspond to registers specified by the ATA/ATAPI standards, 00000000000000000000000000 and transmit the values of the respective registers. This packet enables to recognize the status of the register 108a. The structure of the status packet is not limited to that shown in FIG. 13, but it can be realized by an arbitrary structure that enables to transmit the value of each register. Or it may be a structure that enables to transmit at least a part of the registers.

As for the ATAPI command packet shown in FIG. 10, the register packet shown in FIG. 12, and the status packet shown in FIG. 13, a packet indicating that the reception of them is completed may be returned thereto. Accordingly, even when an error occurs in the transmission path 104, they can be transmitted without fail. The structure of the packet indicating the completion of reception is arbitrary.

Furthermore, a structure of the stream data packet will be explained using FIG. 14 and FIG. 15.

FIG. 14 shows a structure of the stream data packet that transmits the sector data read out from the drive device 101. The data of 32 bytes in each row indicates the data for one frame in the MOST method, and each column indicates a byte location in one frame in the MOST method. In the case of DVD-Video, one sector length is 2048 bytes, and the data of 2048 bytes with a header attached is transmitted as a packet. Here, the sector data is transmitted after being encrypted, and the packet is divided into an area not to be encrypted 801 and an area to be encrypted 802. In the area not to be encrypted 801, "SYNC for encryption" for synchronizing packets and "encryption control" indicating information of whether the packet is to be encrypted or not are transmitted. In the area to be encrypted 802, a "header", a "data length" and data are transmitted. This header is same as that of the command packet as described in FIG. 4. According to this structure, the stream data and the command can be multi-transmitted. The command may be transmitted without being encrypted. Also, the header is unnecessary when the command is not multiplexed.

In order to transmit the stream data as shown in FIG. 14, 32 bytes are transmitted in each frame in the MOST method. When the data of DVD-Video is transmitted, one stream data packet is transmitted using 65 frames of the MOST method. Therefore, the total bytes are 2080, and among them, 4 bytes are not to be encrypted and the remaining 2076 bytes are to be encrypted. Among these 2076 bytes, 2 bytes are allocated to a header, 2 bytes to a data length, 2048 bytes to data, and the remaining 24 bytes to an area for "Reserved", which is padded with arbitrary data. The data length to be transmitted can be changed by the data of the "data length" of 2 bytes, of course. For example, one sector data of 2064 bytes (including a header for the sector) may be transmitted. In this case, an area for "Reserved" is 8 bytes long. The data of an arbitrary length can be transmitted depending upon the data length. In that case, the number of MOST frames and the length of the area for "Reserved" used for transmitting one packet depend upon the data length.

Figure 15:
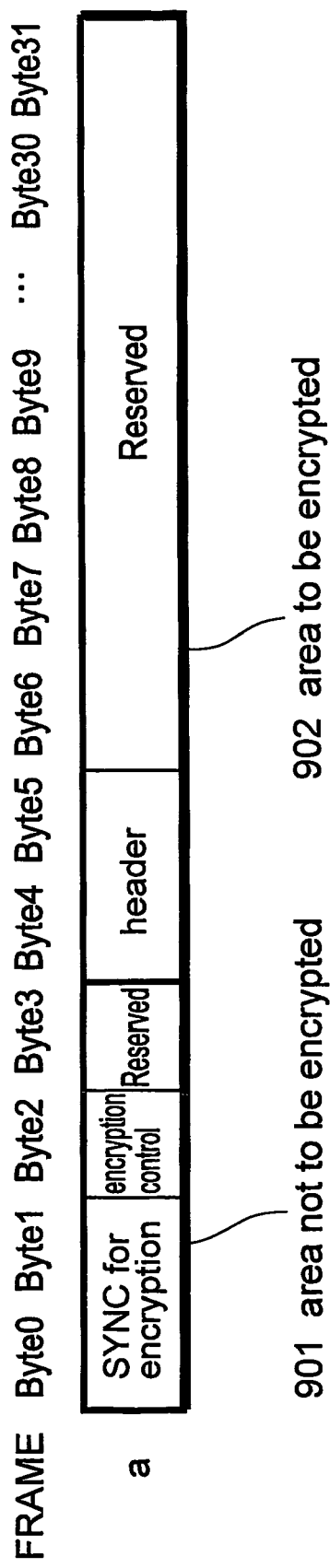
FIG. 15 is a structure example of a NULL packet which is one of the stream data packets according to the present embodiment.

FIG. 15 is a structure example of a NULL packet in the stream data packet. The structure up to the header is same as that of the above-mentioned stream data packet, but in the area following the header, "Reserved" is padded. One NULL packet is transmitted in one frame of the MOST method. Since there is no actual data in an area 902 corresponding to the area 802 in FIG. 14, the area 902 does not need to be encrypted.

Figure 16A:
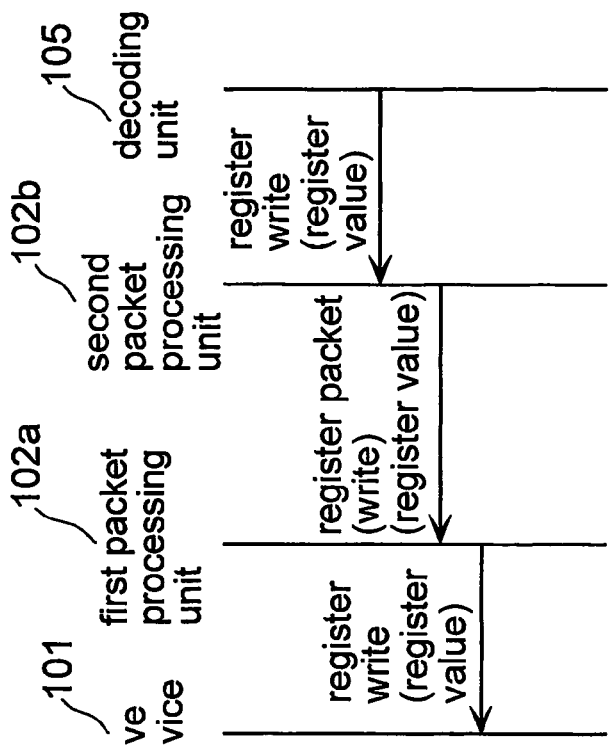
FIG. 16A is a diagram for explaining operations performed when a value of an ATA register is read out according to the present embodiment.
Figure 16B:
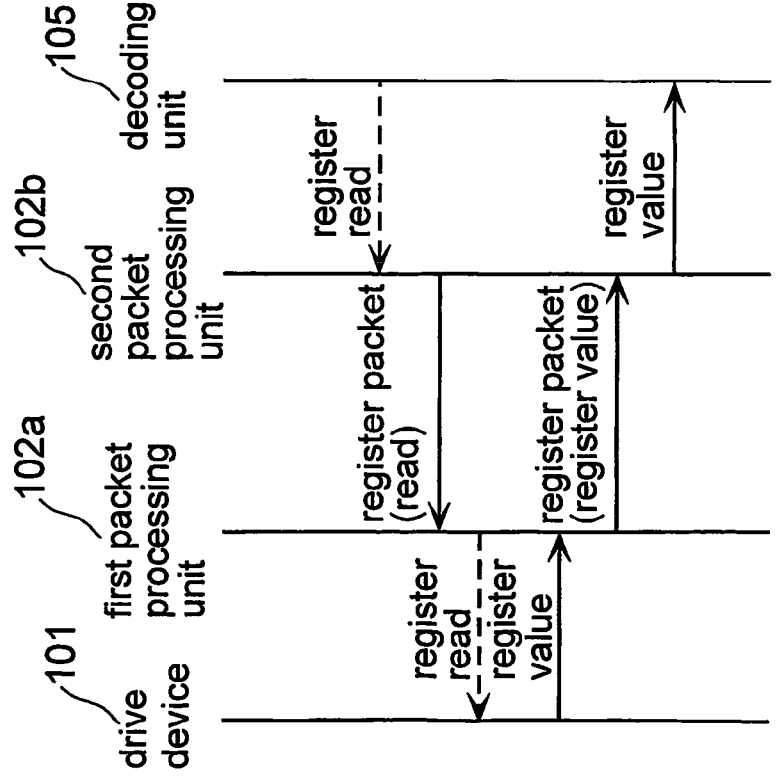
FIG. 16B is a diagram for explaining operations performed when the value of the ATA register is written in according to the present embodiment.

FIGS. 16A and 16B are sequence diagrams that show how an ATA register is read from and written in. As shown in FIG. 16A, when the decoding unit 105 instructs the second packet processing unit 102b to read from the register 108a of the drive device 101, the second packet processing unit 102b sets CS0, CS1, DA0~DA2 and r and sends the register packet so as to instruct the address value and reading thereof. The first packet processing unit 102a reads out from the register 108a of the drive device 101 depending upon the contents of the received register packet, and sends the value to the second packet processing unit 102b with the register packet.

Also, as shown in FIG. 16B, when the decoding unit 105 instructs the second packet processing unit 102b to write in the register 108a of the drive device 101, the second packet processing unit 102b sets CS0, CS1, DA0~DA2 and w and sends the register packet so as to instruct the address value and writing thereof. The first packet processing unit 102a writes the value in the register 108a of the drive device 101 depending upon the contents of the received register packet.

Figure 17:
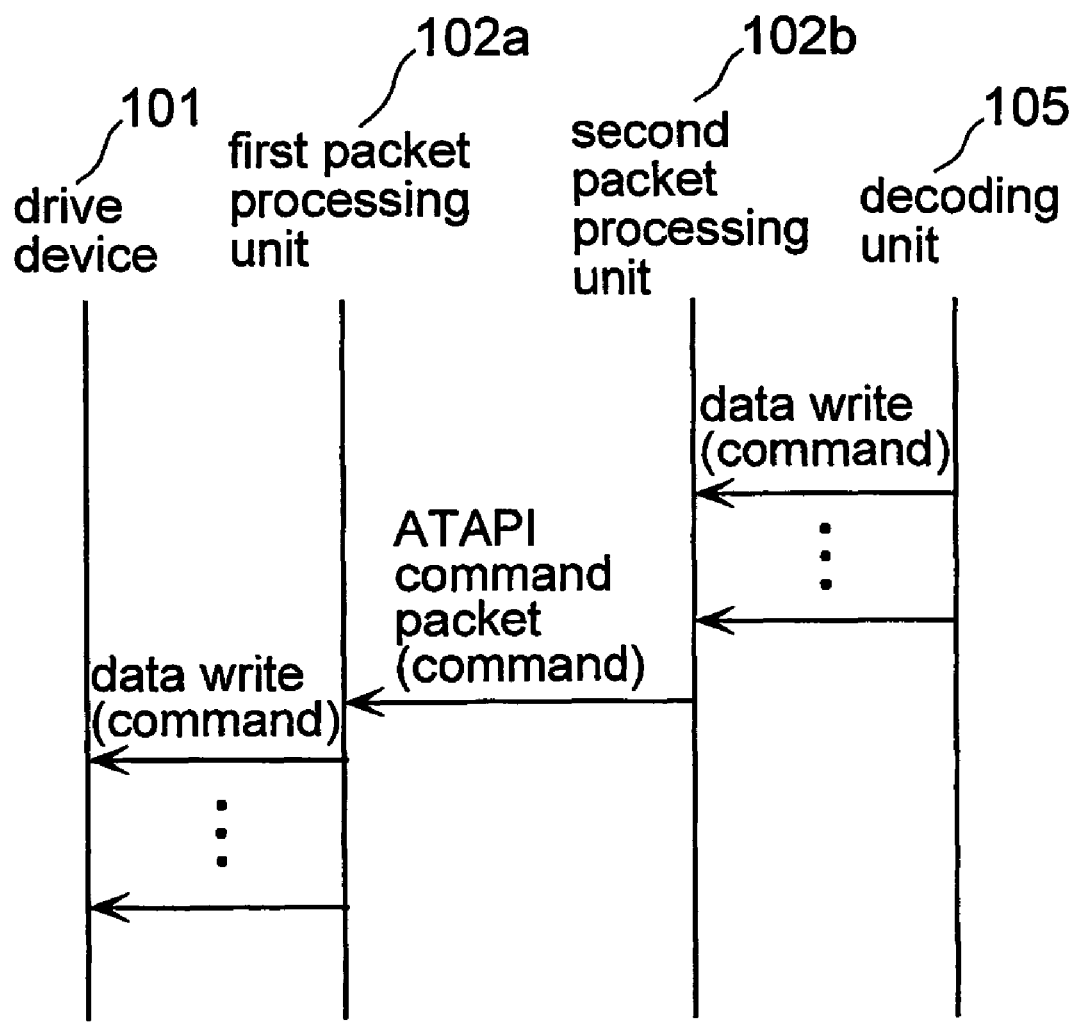
FIG. 17 is a diagram for explaining operations performed when an ATAPI command is sent according to the present embodiment.

FIG. 17 is a sequence diagram that shows how an ATAPI command is sent. When the decoding unit 105 outputs the ATAPI command to the second packet processing unit 102b, the second packet processing unit 102b generates the ATAPI command packet and sends it. The first packet processing unit 102a outputs the ATAPI command of the received ATAPI command packet to the drive device 101.

When there is no data to be transmitted as command, the first packet processing unit 102a and the second packet processing unit 102b generate a NULL packet and send it.

Figure 18:
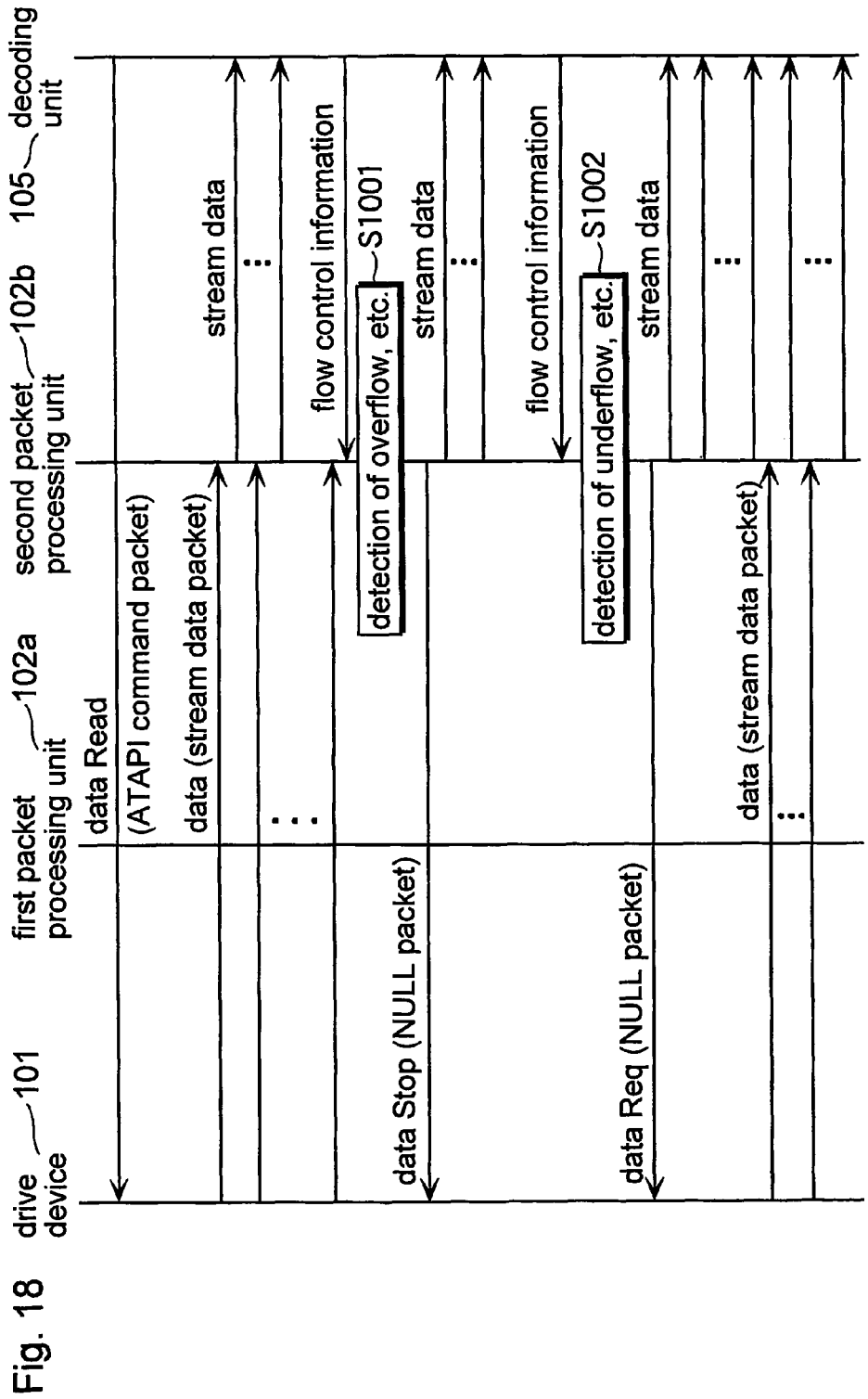
FIG. 18 is a sequence diagram that shows operations performed when the data is read out from the drive device according to the present embodiment.

Next, operations of each device and data flows will be explained. FIG. 18 is a diagram that shows operations performed when DVD-Video data is read out from the drive device 101 and the data flows at that time.

First, using the ATAPI command packet, the decoding unit 105 notifies the drive device 101 of the instruction of reading out the data (data Read) via the first packet processing unit 102b and the first packet processing unit 102a. In response to this notice, the stream data read by the drive device 101 is sent to the second packet processing unit 102b via the first packet processing unit 102a and the transmission path 104 (not shown in the figure).

Although the arrows are omitted in FIG. 18, the first packet processing unit 102a packetizes the stream data in the packet formats as shown in FIG. 14 and FIG. 15, and the command in the packet formats as shown in FIG. 10~FIG. 13. More specifically, the first packet processing unit 102a packetizes one sector data received from the drive device 101 into the stream data packet.

When the decoding unit 105 receives the stream data from the second packet processing unit 102b and decodes the compressed data, the speed of decoding the stream data could be unable to follow the speed of receiving it. In that case, the decoding unit 105 instructs the second packet processing unit 102b to temporarily stop data transfer from the drive device 101.

On the other hand, the second packet processing unit 102b, which holds the stream data of the stream data packet sent from the first packet processing unit 102a in its internal buffer 107b, judges whether the data of a predetermined value (90%, for instance) or more has been stored or not. When the second packet processing unit 102b receives the instruction to temporarily stop the data transfer from the decoding unit 105, or it judges that the data in the buffer 107b is the predetermined value a or more (S1001), it sends a NULL packet of the command with the flow control information embedded to temporarily stop the data transfer (data Stop) to the first packet processing unit 102a. Specifically, C1 in the control data part 206 is set to be "H" (Wait).

Upon receiving the instruction of temporary stopping the data transfer, via the first packet processing unit 102a, the drive device 101 suspends the transfer of the stream data. The first packet processing unit 102a stops packetizing the data, and outputs the NULL packet of the command packet without the data part and the NULL packet having no stream data to be packetized (which are not shown in FIG. 18).

After a while, when the decoding speed of the decoding unit 105 has caught up with the speed of receiving the stream data, the decoding unit 105 instructs the second packet processing unit 102b to resume the data transfer from the drive device 101. In response to this instruction, when the second packet processing unit 102b judges that the stream data stored in the buffer 107b has become a predetermined value b (10%, for instance) or less (S1002), it instructs the first packet processing unit 102a to resume the data transfer (data Req) using the NULL packet.

Furthermore, when the decoding unit 105 wants to stop the reproduction of the stream data halfway or switch it to the reading of the data at another address, it can instruct to clear the remaining data in the buffer of the first packet processing unit 102a with a signal of buffer clear indicated in the header of the command. Upon receiving the instruction of the buffer clear with the signal of buffer clear, the first packet processing unit 102a abandons all the stream data that it holds.

In the above-mentioned manner, the flow control between the decoding unit 105 and the drive device 101 is executed.

As described above, since (i) the transmission device 10 of the present embodiment includes the sending device 11 that packetizes the stream data and the command separately and outputs them, and (ii) the receiving device 12 that outputs the packet in which the command and the flow control information are multiplexed, all of the stream data, the command and the flow control information can be sent and received using the synchronous channel area 703 of the transmission path 104. Therefore, when the transmission method of the transmission path 104 is applied to the MOST method, the bandwidth of the transmission path 104 can use used efficiently without using the asynchronous channel area 704.

The present embodiment is configured so as to transmit the command packet and the stream data packet separately, but it can be configured to execute the flow control using the stream data packet only by incorporating the flow control information into the header 201 of the stream data packet, as shown in FIG. 14 and FIG. 15.

As mentioned above, according to the transmission method of the embodiment of the present invention, the stream data, the command and the flow control information are all transmitted using the synchronous channel. As a result, the effect of the data delay of flow control information can be reduced, and therefore an application such as DVD-Video requiring a real-time control of data reading/writing can be realized. In addition, since the ATAPI command is transmitted, interconnection is easy.

In the above embodiment, the transmission method of the present invention has been explained in the case of the sending device and the receiving device, separately, for convenience. However, by configuring the method so that the sending device has the functions of the receiving device and the receiving device has the function of the sending device, it is possible to transmit the stream data, command and the flow control information in each direction using the synchronous channel.

Also, in the above embodiment, a DVD-Video drive has been explained as an example of the drive device 101. However, anything that transmits the stream data and the command which must be transmitted in real time, for example, a drive of a recording medium such as CD, MD, DAT, DVD-Audio or a hard disk, or a tuner for digital TV broadcast or a digital radio, are applicable.

Furthermore, in the present embodiment, it has been explained that the construction of the drive device 101 is in accordance with the ATA or ATAPI standard, but it is not limited to these standards. Therefore, the register 108a is not always necessary in that case. Likewise, the register 108b of the decoding unit 105 in the receiving device 12 is not always necessary, too.

The decoding unit 105 can be uniquely determined if only the drive device 101 is determined. The decoder of MPEG-2 is described in the present embodiment because the drive device 101 is a DVD-Video drive, but another decoder can be used, or the decoder can be omitted. Any decoder that fits the drive device 101 is applicable.

Also, the constructions of the first packet processing unit 102a and the second packet processing unit 102b as shown in FIG. 6~FIG. 9 are just examples. They are not limited to these constructions, and may be arbitrary constructions that can realize same functions.

Also, the structures of the command packet as shown in FIG. 4~FIG. 13 are just examples, and an arbitrary structure is applicable if it can transmit the ATAPI command and further multiplex the flow control information. In addition, the structures of the stream data packet as shown in FIG. 14 and FIG. 15 are also examples, and an arbitrary structure is applicable if it can transmit the stream data such as DVD-Video which is read out in response to the ATAPI command.

The present embodiment is configured so that the receiving device 12 reads out the stream data from the sending device 11 using the ATAPI command. However, it is applicable as a method of transmitting a packet format as it is if it is configured so that the receiving device 12 writes the stream data in the sending device 11 using the ATAPI command. In this case, the display device 106 and the decoding unit 105 are replaced with the drive device 101 and the stream data is transmitted in the reverse direction, the flow is also controlled in the reverse direction.

In the present embodiment, the response to the command packet has not been described. However, if it is configured to return a response packet indicating success or failure of reception, reliability of transmission improves, of course.

In the present embodiment, the transmission path 104 of the MOST method has been explained as an example, but any digital transmission method using the synchronous channel area, such as the transmission method pursuant to the IEEE1394 standard, is applicable.

Furthermore, the present embodiment is configured so as to use the synchronous channel as a channel for transmitting the stream data. However, an asynchronous channel that does not guarantee to send data within a certain time period of a transmission delay may be used if it is possible to execute the flow control using the flow control information.

As described above, when an enormous amount of data such as DVD-Video is transmitted, via a network, the transmission method, the sending device, and the receiving device according to the present invention are suitable for a transmission system for which the method of transmitting information for flow control is not determined, although the flow control is required for adjusting the transmission amount of data in real time due to the difference of data processing capability between the sending side and the receiving side.

The invention claimed is:

1. A transmission device comprising:
a sending device; and
a receiving device,
wherein said sending device and said receiving device are connected to each other via a transmission path compliant with a MOST method,
wherein said sending device includes:
a drive device that reads stream data from a disk on which the stream data is recorded, and that outputs the read stream data;
a first packet processing unit configured to receive the stream data from said drive device, and generate a stream data packet using the stream data; and
a first transmission path I/F unit configured to output the stream data packet generated by said first packet processing unit to the transmission path, wherein said receiving device includes:
  a second transmission path I/F unit configured to receive the stream data packet via the transmission path;
  a second packet processing unit configured to extract stream data from the stream data packet received by said second transmission path I/F unit, and generate a first command packet in which predetermined flow control information is placed; and
  a decoding unit configured to decode the stream data extracted by said second packet processing unit, and determine whether or not it is necessary to cause said sending device to suspend, based on a process status of the decoding, sending of the stream data,
wherein said second packet processing unit is configured to place, in a header of the first command packet, flow control information used for causing said sending device to suspend the sending of the stream data, when said decoding unit determines that the suspension of the sending of the stream data is necessary,
wherein said second transmission path I/F unit is configured to allocate, to a synchronous channel area compliant with the MOST method, the first command packet in which the flow control information is placed, and output the first command packet to the transmission path,
wherein said drive device determines a status of said drive device regarding either the reading or the outputting of the stream data,
wherein said first packet processing unit is configured to generate a second command packet by packetizing a command including flow control information indicating the status determined by said drive device,
wherein said first transmission path I/F unit is configured to output the generated second command packet to the transmission path,
wherein said first packet processing unit is configured to place, in a header of the second command packet, flow control information indicating the status of said drive device, and
wherein said first transmission path I/F unit is configured to allocate, to a synchronous channel area of a frame compliant with the MOST method, the stream data packet and the second command packet in which the flow control information indicating the status of said drive device is placed, and output the stream data packet and the second command packet.

2. The transmission device according to claim 1,
wherein said first transmission path I/F unit is configured to receive the first command packet via the transmission path,
wherein said first packet processing unit is configured to extract the flow control information from the header of the received first command packet, and output the extracted flow control information to said drive device, and
wherein said drive device receives the flow control information from said first packet processing unit, and suspends, based on the flow control information, the outputting of the stream data by said drive device.

3. The transmission device according to claim 1, wherein the first command packet and the second command packet each include (i) the header further including information indicating a synchronization code and a packet type, and (ii) a command data part.

4. The transmission device according to claim 1,
wherein said sending device includes a multiplexing unit configured to multiplex the stream data packet and the second command packet into a multiplexed packet, and
wherein said first transmission path I/F unit is configured to output the multiplexed packets to the transmission path.

5. The transmission device according to claim 1,
wherein said drive device is a DVD device,
wherein said decoding unit is configured to decode stream data compressed based on an MPEG-2 standard, and
wherein said first transmission path I/F unit is configured to allocate a bandwidth of at least 11.08 Mbps to the stream data packet and output the stream data packet, so as to transmit the stream data packet on the transmission path.

6. A transmission device comprising:
a sending device; and
a receiving device,
wherein said sending device and said receiving device are connected to each other via a transmission path,
wherein said sending device includes:
  a DVD device that reads stream data compressed in compliance with an MPEG-2 standard from a DVD on which the stream data is recorded, and that outputs the read stream data;
  a first packet processing unit configured to receive the stream data from said DVD device, and generate a stream data packet using the stream data; and
  a first transmission path I/F unit configured to allocate a bandwidth of at least 11.08 Mbps to the stream data packet generated by said first packet processing unit, and output the stream data packet generated by said first packet processing unit to the transmission path, so as to transmit the stream data packet on the transmission path,
wherein said receiving device includes:
  a second transmission path I/F unit configured to receive the stream data packet via the transmission path;
  a second packet processing unit configured to extract stream data from the stream data packet received by said second transmission path I/F unit, and generate a first command packet which allows setting of predetermined flow control information; and
  a decoding unit configured to decode the stream data extracted by said second packet processing unit, and determine whether or not it is necessary to cause said sending device to suspend, based on a process status of the decoding, sending of the stream data,
wherein said second packet processing unit is configured to place, in a header of the first command packet, flow control information used for causing said sending device to suspend the sending of the stream data, when said decoding unit determines that the suspension of the sending of the stream data is necessary,
wherein said second transmission path I/F unit is configured to allocate, to a channel area where transmission of information within a certain time period of a transmission delay is guaranteed, the first command packet in which the flow control information is placed, and output the first command packet to the transmission path,
wherein said DVD device determines a status of said DVD device regarding either the reading or the outputting of the stream data,
wherein said first packet processing unit is configured to generate a second command packet by packetizing a command including flow control information indicating the status determined by said DVD device,
wherein said first transmission path I/F unit is configured to output the generated second command packet to the transmission path, wherein said first packet processing unit is configured to place, in a header of the second command packet, control signal information indicating the status determined by said DVD device, and wherein said first transmission path I/F unit is configured to allocate, to a channel area where transmission of information within a certain time period of a transmission delay is guaranteed, the stream data packet and the second command packet, and output the stream data packet and the second command packet.

7. The transmission device according to claim 6, wherein said first transmission path I/F unit is configured to receive the first command packet via the transmission path, wherein said first packet processing unit is configured to extract the flow control information from the header of the received first command packet, and output the extracted flow control information to said DVD device, and wherein said DVD device receives the flow control information from said first packet processing unit, and suspends, based on the flow control information, the outputting of the stream data by said DVD device.

8. The transmission device according to claim 6, wherein said sending device includes a multiplexing unit configured to multiplex the stream data packet and the second command packet into a multiplexed packet, and wherein said first transmission path I/F unit is configured to output the multiplexed packets to the transmission path.

9. The transmission device according to claim 6, wherein the first command packet and the second command packet each include (i) the header further including information indicating a synchronization code and a packet type, and (ii) a data part.

10. The transmission device according to claim 6, wherein the transmission path is a transmission path compliant with a MOST method, wherein said second transmission path I/F unit is configured to allocate, to a synchronous channel area of a frame compliant with the MOST method, the first command packet, and output the first command packet on the transmission path, and wherein said first transmission path I/F unit is configured to allocate, to the synchronous channel area of the frame compliant with the MOST method, the stream data packet and the second command packet, and output the stream data packet and the second command packet on the transmission path.

11. A sending device in a transmission device including said sending device and a receiving device that are connected to each other via a transmission path compliant with a MOST method, said sending device comprising:

a drive device that reads stream data from a disk on which the stream data is recorded, and that outputs the read stream data;

a first packet processing unit configured to receive the stream data from said drive device, and generate a stream data packet using the stream data; and a first transmission path I/F unit configured to output the stream data packet generated by said first packet processing unit to the transmission path, wherein said first transmission path I/F unit is configured to receive, via the transmission path, a first command packet that is outputted from the receiving device, wherein said first packet processing unit is configured to extract flow control information from a header of the received first command packet, and output the extracted flow control information to said drive device, wherein said drive device receives the flow control information from said first packet processing unit, and suspends, based on the flow control information, the outputting of the stream data by said drive device, wherein said drive device determines a status of said drive device regarding either the reading or the outputting of the stream data, wherein said first packet processing unit is configured to generate a second command packet by packetizing a command including flow control information indicating the status determined by said drive device, wherein said first transmission path I/F unit is configured to output the generated second command packet to the transmission path, wherein said first packet processing unit is configured to place, in a header of the second command packet, flow control information indicating the status of said drive device, and wherein said first transmission path I/F unit is configured to allocate, to a synchronous channel area of a frame compliant with the MOST method, the stream data packet and the second command packet in which the flow control information indicating the status of said drive device is placed, and output the stream data packet and the second command packet.

12. A sending device in a transmission device including said sending device and a receiving device that are connected to teach other via a transmission path, said sending device comprising:

a DVD device that reads stream data compressed in compliance with an MPEG-2 standard from a DVD on which the stream data is recorded, and that outputs the read stream data;

a first packet processing unit configured to receive the stream data from said DVD device, and generate a stream data packet using the stream data; and a first transmission path I/F unit configured to allocate a bandwidth of at least 11.08 Mbps to the stream data packet generated by said first packet processing unit, and output the stream data packet to the transmission path, so as to transmit the stream data packet on the transmission path, wherein said first transmission path I/F unit is configured to receive, via the transmission path, a first command packet that is outputted from the receiving device, wherein said first packet processing unit is configured to extract the flow control information from a header of the received first command packet, and output the extracted flow control information to said DVD device, wherein said DVD device receives the flow control information from said first packet processing unit, and suspends, based on the flow control information, the outputting of the stream data by said DVD device, wherein said DVD device determines a status of said DVD device regarding either the reading or the outputting of the stream data, wherein said first packet processing unit is configured to generate a second command packet by packetizing a command including flow control information indicating the status determined by said DVD device, wherein said first transmission path I/F unit is configured to output the generated second command packet to the transmission path, wherein said first packet processing unit is configured to place, in a header of the second command packet, control signal information indicating the status determined by said DVD device, and wherein said first transmission path I/F unit is configured to allocate, to a channel area where transmission of information within a certain time period of a transmission delay is guaranteed, the stream data packet and the second command packet, and output the stream data packet and the second command packet.

13. A transmission method for use in a transmission device including a sending device and a receiving device that are connected to each other via a transmission path compliant with a MOST method, wherein said transmission method for use in the sending device comprises:

reading stream data from a disk on which the stream data is recorded, and outputting the read stream data;

generating a stream data packet using the stream data outputted in said outputting of the read stream data; and outputting the stream data packet generated in said generating to the transmission path, wherein said transmission method for use in the receiving device comprises:

obtaining the stream data packet via the transmission path;

extracting stream data from the stream data packet obtained in said obtaining, and generating a first command packet in which predetermined flow control information is placed; and decoding the stream data extracted in said extracting, and determining whether or not it is necessary to cause the sending device to suspend, based on a process status of said decoding, sending of the stream data, wherein, in said extracting and generating, flow control information used for causing the sending device to suspend the sending of the stream data is placed in a header of the first command packet, when it is determined in said decoding and determining that the suspension of the sending of the stream data is necessary, wherein, in said obtaining, the first command packet, in which the flow control information is placed, is allocated to a synchronous channel area compliant with the MOST method, and is outputted to the transmission path, and wherein said transmission method for use in the sending device further comprises:

determining a status of a drive device, which performs said reading of the stream data from the disk, regarding either the reading or the outputting of the stream data;

generating a second command packet by packetizing a command including flow control information indicating the status determined by said determining of the status of the drive device;

outputting the generated second command packet to the transmission path;

placing, in a header of the second command packet, flow control information indicating the status determined by said determining of the status of the drive device; and allocating, to a synchronous channel area of a frame compliant with the MOST method, the stream data packet and the second command packet in which the flow control information indicating the status determined by said determining of the status of the drive device is placed, and outputting the stream data packet and the second command packet.

14. A transmission method for use in a transmission device including a sending device and a receiving device that are connected to each other via a transmission path, wherein said transmission method for use in the sending device comprises:

reading stream data compressed in compliance with an MPEG-2 standard from a DVD on which the stream data is recorded, and outputting the read stream data;

generating a stream data packet using the stream data outputted in said outputting of the read stream data; and allocating a bandwidth of at least 11.08 Mbps to the stream data packet generated in said generating, and outputting the stream data packet generated in said generating to the transmission path, so as to transmit the stream data packet on the transmission path, wherein said transmission method for use in the receiving device comprises:

obtaining the stream data packet via the transmission path;

extracting stream data from the stream data packet obtained in said obtaining, and generating a first command packet in which predetermined flow control information is placed; and decoding the stream data extracted in said extracting, and determining whether or not it is necessary to cause the sending device to suspend, based on a process status of said decoding, sending of the stream data, wherein, in said extracting and generating, flow control information used for causing the sending device to suspend the sending of the stream data is placed in a header of the first command packet, when it is determined in said decoding and determining that the suspension of the sending of the stream data is necessary, wherein, in said obtaining, the first command packet in which the flow control information is placed, is allocated to a channel area where transmission of information within a certain time period of a transmission delay is guaranteed, and is outputted to the transmission path, and wherein said transmission method for use in the sending device further comprises:

determining a status of a DVD device, which performs said reading of the stream data, regarding either the reading or the outputting of the stream data;

generating a second command packet by packetizing a command including flow control information indicating the status determined by said determining of the status of the DVD device;

outputting the generated second command packet to the transmission path;

placing, in a header of the second command packet, control signal information indicating the status determined by said determining of the status of the DVD device; and allocating, to a channel area where transmission of information within a certain time period of a transmission delay is guaranteed, the stream data packet and the second command packet, and outputting the stream data packet and the second command packet.

15. A computer-readable recording medium having a program recorded thereon, the program for use in a sending device in a transmission device including the sending device and a receiving device that are connected to each other via a transmission path compliant with a MOST method, said program causing a computer to execute a method comprising:

reading stream data from a disk on which the stream data is recorded, and outputting the read stream data;

generating a stream data packet using the stream data outputted in said outputting of the read stream data; and outputting the stream data packet generated in said generating to the transmission path, wherein, in said outputting of the stream data packet, a first command packet that is outputted from the receiving device is received via the transmission path, wherein, in said generating, flow control information is extracted from a header of the received first command packet, wherein, in said reading and outputting, the outputting of the stream data is suspended based on the flow control information extracted in said generating, and wherein the method executed by the computer further comprises:

determining a status of a drive device, which performs said reading of the stream data from the disk, regarding either the reading or the outputting of the stream data;

generating a second command packet by packetizing a command including flow control information indicating the status determined by said determining of the status of the drive device;

outputting the generated second command packet to the transmission path;

placing, in a header of the second command packet, flow control information indicating the status determined by said determining of the status of the drive device; and allocating, to a synchronous channel area of a frame compliant with the MOST method, the stream data packet and the second command packet in which the flow control information indicating the status determined by said determining of the status of the drive device is placed, and outputting the stream data packet and the second command packet.

16. A computer-readable recording medium having a program recorded thereon, the program for use in a sending device in a transmission device including the sending device and a receiving device that are connected to each other via a transmission path, said program causing a computer to execute a method comprising:

reading stream data compressed in compliance with an MPEG-2 standard from a DVD on which the stream data is recorded, and outputting the read stream data;

generating a stream data packet using the stream data outputted in said outputting of the read stream data; and allocating a bandwidth of at least 11.08 Mbps to the stream data packet generated in said generating, and outputting the stream data packet generated in said generating to the transmission path, so as to transmit the stream data packet on the transmission path, wherein, in said allocating and outputting, a first command packet that is outputted from the receiving device is received via the transmission path, wherein, in said generating, flow control information is extracted from a header of the received first command packet, wherein, in said reading and outputting, the outputting of the stream data is suspended based on the flow control information extracted in said generating, and wherein the method executed by the computer further comprises:

determining a status of a DVD device, which performs said reading of the stream data, regarding either the reading or the outputting of the stream data;

generating a second command packet by packetizing a command including flow control information indicating the status determined by said determining of the status of the DVD device;

outputting the generated second command packet to the transmission path;

placing, in a header of the second command packet, control signal information indicating the status determined by said determining of the status of the DVD device; and allocating, to a channel area where transmission of information within a certain time period of a transmission delay is guaranteed, the stream data packet and the second command packet, and outputting the stream data packet and the second command packet.

* * * * *